United States Patent
Ohmura

(10) Patent No.: US 11,277,053 B2
(45) Date of Patent: Mar. 15, 2022

(54) ROTOR, MOTOR, AND METHOD FOR MANUFACTURING ROTOR

(71) Applicant: MINEBEA MITSUMI Inc., Nagano (JP)

(72) Inventor: Jun Ohmura, Shizuoka (JP)

(73) Assignee: MINEBEA MITSUMI, INC., Nagano (JP)

( * ) Notice: Subject to any disclaimer, the term of this patent is extended or adjusted under 35 U.S.C. 154(b) by 70 days.

(21) Appl. No.: 16/961,815

(22) PCT Filed: Aug. 27, 2018

(86) PCT No.: PCT/JP2018/031596
§ 371 (c)(1),
(2) Date: Jul. 13, 2020

(87) PCT Pub. No.: WO2019/150629
PCT Pub. Date: Aug. 8, 2019

(65) Prior Publication Data
US 2021/0075294 A1   Mar. 11, 2021

(30) Foreign Application Priority Data

Jan. 31, 2018 (JP) .............................. JP2018-014642

(51) Int. Cl.
*H02K 7/04* (2006.01)
*H02K 7/08* (2006.01)
*H02K 15/16* (2006.01)

(52) U.S. Cl.
CPC ............... *H02K 7/04* (2013.01); *H02K 7/083* (2013.01); *H02K 15/165* (2013.01)

(58) Field of Classification Search
CPC ............ H02K 1/00; H02K 1/27; H02K 1/272; H02K 1/2726; H02K 1/273; H02K 1/2733;
(Continued)

(56) References Cited

U.S. PATENT DOCUMENTS 4,933,583 A * 6/1990 Ripplinger ............. H02K 1/278
310/156.22
2012/0062050 A1   3/2012 Horng et al.
(Continued)

FOREIGN PATENT DOCUMENTS

JP   2006-304565 A   11/2006
JP   2007-135332 A    5/2007
(Continued)

OTHER PUBLICATIONS

International Search Report for corresponding International Application No. PCT/JP2018/031596 dated Nov. 13, 2018.
(Continued)

*Primary Examiner* — Tran N Nguyen
(74) *Attorney, Agent, or Firm* — Pearne & Gordon LLP

(57) ABSTRACT

A rotor according to an embodiment includes a cylindrical magnet and a balance adjusting portion. The balance adjusting portion is provided to at least one end portion of the magnet in a rotation axis direction, and is used for adjusting rotational balance of the rotor. The balance adjusting portion has a first member that is in contact with an end portion of the magnet and a second member press-fitted onto the rotary shaft with the first member interposed therebetween.

12 Claims, 6 Drawing Sheets

(58) Field of Classification Search
CPC .. H02K 1/28; H02K 7/00; H02K 7/04; H02K 7/08; H02K 7/083; H02K 15/00; H02K 15/02; H02K 15/03; H02K 15/16; H02K 15/165

See application file for complete search history.

(56) References Cited

U.S. PATENT DOCUMENTS

| | | | |
|---|---|---|---|
| 2014/0062226 A1* | 3/2014 | Cho | H02K 29/08 310/43 |
| 2014/0363314 A1* | 12/2014 | Jiang | F04F 5/16 417/84 |
| 2015/0084464 A1 | 3/2015 | Ramdane et al. | |

FOREIGN PATENT DOCUMENTS

| | | | | |
|---|---|---|---|---|
| JP | 2007135332 | * | 5/2007 | ............... H02K 7/04 |
| JP | 2015-070786 A | | 4/2015 | |

OTHER PUBLICATIONS

Written Opinion for corresponding International Application No. PCT/JP2018/031596 dated Nov. 13, 2018.

English translation of the Written Opinion for corresponding International Application No. PCT/JP2018/031596 dated Nov. 13, 2018.

* cited by examiner

ROTOR, MOTOR, AND METHOD FOR MANUFACTURING ROTOR

FIELD

The present invention relates to a rotor, a motor, and a method for manufacturing a rotor.

BACKGROUND

Conventionally, particularly in rotating electrical machine such as high-speed motors, a rotor including a balance adjusting portion for adjusting rotational balance of the rotor serving as a rotating body has been proposed. In this rotor, imbalance of rotation is corrected by shaving an outer peripheral surface of the balance adjusting portion or adding putty onto the outer peripheral surface.

CITATION LIST

Patent Literature

Patent Literature 1: Japanese Laid-open Patent Publication No. 2007-135332

SUMMARY

Technical Problem

When the balance adjusting portion and a rotary shaft are fixed to each other, it is common that the inner diameter of the balance adjusting portion is set larger than the outer diameter of the rotary shaft and adhesive is applied into a gap that is formed due to difference between the diameters, so that the balance adjusting portion and the rotary shaft are fixed one another.

However, when both are fixed by the above-described method, both may be fixed in an eccentric manner due to misalignment between the balance adjusting portion and the rotary shaft.

The present invention has been made in view of the above-described circumstances, and an object of the present invention is to provide a rotor, a motor, and a method for manufacturing a rotor that enable a balance adjusting portion and a rotary shaft to be fixed to each other without being eccentric.

Solution to Problem

It is an object of the present invention to solve the problems in the conventional technology. A rotor according to an embodiment includes a cylindrical magnet and a balance adjusting portion. The balance adjusting portion is provided to at least one end portion of the magnet in a rotation axis direction, and is used for adjusting rotational balance of the rotor. The balance adjusting portion has a first member that is in contact with an end portion of the magnet and a second member press-fitted onto the rotary shaft with the first member interposed therebetween.

Advantageous Effects of Invention

According to an aspect of the present invention, the rotor, a motor, and a method for manufacturing a rotor can be provided that enable the balance adjusting portion and the rotary shaft to be fixed to each other without being eccentric.

DESCRIPTION OF EMBODIMENTS

Figure 1:
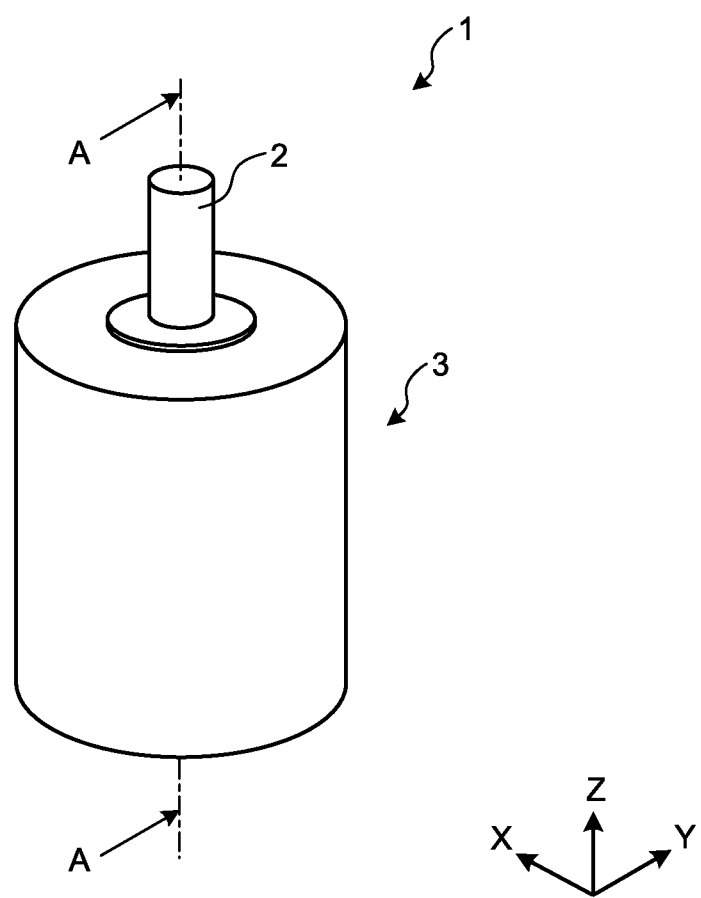
FIG. 1 is a perspective view of a motor according to an embodiment.

A rotor, a motor, and a method for manufacturing a rotor according to an embodiment will now be described with reference to the drawings. Herein, dimensional relations among elements, ratios of the elements, and the like in the drawings may be different from the actual ones. Furthermore, dimensional relations or ratios of the same portions may be different between the drawings. Hereinafter, as an example of the motor, a brushless motor of an inner rotor type will be described.

The appearance of the motor according to the embodiment will be described first with reference to FIG. 1. FIG. 1 is a perspective view of a motor 1 according to the embodiment.

As illustrated in FIG. 1, the motor 1 according to the embodiment includes a rotary shaft 2 and a body portion 3. The rotary shaft 2 is provided so as to extend at a position passing through the central axis of the body portion 3 having a cylindrical shape and protrude from the body portion 3 toward a positive side of a Z-axis direction that is the axial direction thereof. Hereinafter, the Z-axis direction in which the rotary shaft 2 extends is referred to as a rotation axis direction. In each drawing, a three-dimensional rectangular coordinate system including the Z-axis is illustrated for the description to be easily understood.

Figure 2:
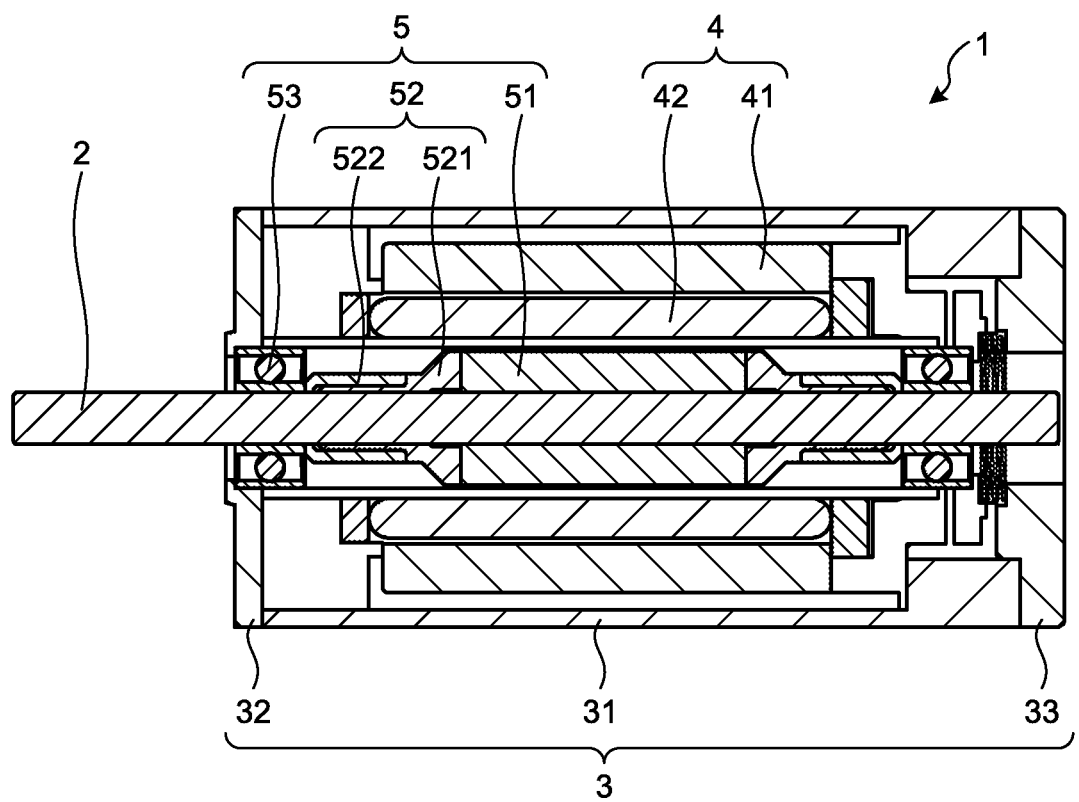
FIG. 2 is a sectional view of the motor according to the embodiment.
Figure 2:
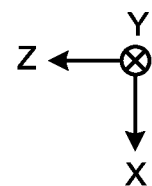

The body portion 3 is a housing having a substantially cylindrical shape, and accommodates a stator 4 and a rotor 5 therein, for example, described later. Referring to FIG. 2, the following describes an internal structure of the body portion 3 in the motor 1.

FIG. 2 is a sectional view of the motor 1 according to the embodiment. In FIG. 2, a cross-section of the motor 1 taken along line A-A in FIG. 1 is illustrated. As illustrated in FIG. 2, the motor 1 includes the stator 4 and the rotor 5.

As illustrated in FIG. 2, the stator 4 and the rotor 5 are accommodated inside the body portion 3 by a tubular portion 31, a first cap 32, and a second cap 33 of the body portion 3.

The stator 4 is a stationary component of the motor 1, and includes: a cylindrical stator core 41 that is formed by stacking a plurality of plate-shaped metal members such as soft magnetic steel plates, for example, silicon steel sheets or magnetic steel sheets; and a coil 42 that is wound around teeth (not illustrated) included in the stator core 41.

The rotor 5 is a rotary component of the motor 1, and includes a magnet 51, balance adjusting portions 52, and bearing portions 53. The magnet 51 is a cylindrical permanent magnet, for example, and is fixed to the rotary shaft 2. As the magnet 51, a ferrite magnet or a neodymium magnet, for example, can be used.

The balance adjusting portions 52 are provided to both ends of the magnet 51 in the rotation axis direction, and are used for adjusting the rotational balance of the rotor 5. Specifically, regarding the balance adjusting portions 52, the rotational balance is adjusted by shaving outer peripheral surfaces thereof on the basis of imbalance of rotation that is measured in advance by a test, for example.

Each balance adjusting portion 52 includes a first member 521 and a second member 522. Details of the first member 521 and the second member 522 will be described later. In FIG. 2, a case is illustrated in which the balance adjusting portions 52 are provided to both ends of the magnet 51. However, the balance adjusting portion 52 may be provided singly to either one end portion of both ends.

A pair of the bearing portions 53 are provided in a press-fitted manner at such positions that the magnet 51 and the balance adjusting portions 52 are interposed therebetween in the Z-axis direction that is the rotation axis direction, and rotatably support the rotary shaft 2. With this configuration, the magnet 51 and the balance adjusting portions 52 can be prevented from being displaced in the rotation axis direction. For example, the bearing portions 53 can be configured with rolling bearings such as ball bearings, but are not limited to them, and may be configured with other structures such as plain bearings and magnetic bearings.

In general, when each balance adjusting portion is fixed to a rotary shaft, the inner diameter of the balance adjusting portion is set larger than the outer diameter of the rotary shaft, and both are fixed by applying adhesive into a gap that is formed due to diameter difference therebetween.

However, when a conventional balance adjusting portion is fixed thereto with adhesive as described above, the respective central axes of the balance adjusting portion and the rotary shaft may be misaligned, and consequently both may be fixed in an eccentric manner.

If the inner diameter of the balance adjusting portion is set smaller than the outer diameter of the rotary shaft, when the balance adjusting portion is press-fitted onto the rotary shaft to be fixed thereto, no gap is formed therebetween. However, when the balance adjusting portion is press-fitted, a surface of the rotary shaft may be damaged or the rotary shaft may be deformed.

In view of this, each balance adjusting portion 52 according to the embodiment includes two members, which are the first member 521 and the second member 522, and the second member 522 is press-fitted onto the rotary shaft 2 with the first member 521 interposed therebetween. Specifically, the first member 521 presses the second member 522, and this pressure causes the second member 522 to press the rotary shaft 2, whereby the balance adjusting portion 52 is fixed to the rotary shaft 2. In other words, the balance adjusting portion 52 is fixed thereto in such a manner that the bore of the first member 521 fits on the circumference of the rotary shaft 2 (also called "interference fit").

With this configuration, no gap is formed between the balance adjusting portion 52 and the rotary shaft 2, whereby the balance adjusting portion 52 can be prevented from being fixed to the rotary shaft 2 in an eccentric manner. Furthermore, in the balance adjusting portion 52, the second member 522 is press-fitted onto the rotary shaft 2 with the first member 521 interposed therebetween. In other words, when the second member 522 is press-fitted, the surface of the rotary shaft 2 is protected by the first member 521. Thus, the surface of the rotary shaft 2 can be prevented from being damaged.

As described above, in the rotor 5 according to the embodiment, without damaging the surface of the rotary shaft 2, the balance adjusting portion 52 can be fixed thereto with high concentricity.

Figure 3:
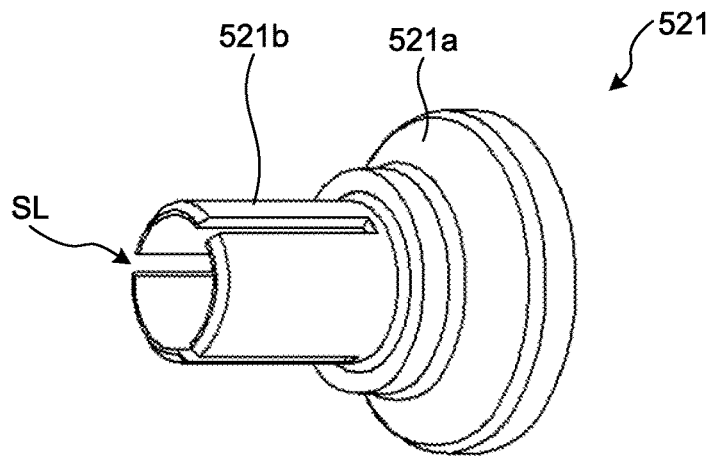
FIG. 3 is a perspective view of a first member of a balance adjusting portion according to the embodiment.
Figure 3:
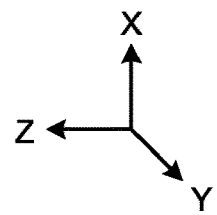
Figure 4:
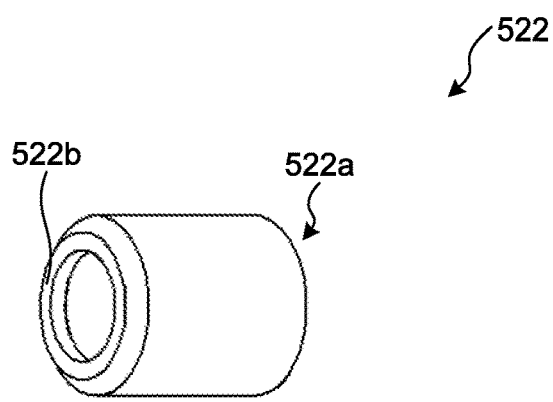
FIG. 4 is a perspective view of a second member of the balance adjusting portion according to the embodiment.
Figure 4:
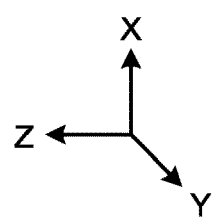

Referring to the FIG. 3 and FIG. 4, the following further describes each balance adjusting portion 52 according to the embodiment. FIG. 3 is a perspective view of the first member 521 of the balance adjusting portion 52 according to the embodiment. FIG. 4 is a perspective view of the second member 522 of the balance adjusting portion 52 according to the embodiment.

The first member 521 will be described first with reference to FIG. 3. As illustrated in FIG. 3, the first member 521 includes a base-end portion 521a and a distal-end portion 521b. The first member 521 may be configured by integrally forming the base-end portion 521a and the distal-end portion 521b or assembling these portions as separate members.

The base-end portion 521a is an adjustment part that includes, for example, metallic material such as brass or stainless steel and used for adjusting the rotational balance of the rotor 5. The adjustment part does not necessarily have to be formed in the first member 521, and may be formed in the second member 522 described later.

Specifically, the adjustment part of the base-end portion 521a has a tapered shape that tapers down toward the distal-end portion 521b, and the part having this tapered shape is formed so as to have a large thickness. In other words, forming the adjustment part of the base-end portion 521a to have a large thickness increases the amount to be shaved, thereby allowing the adjustment range for rotational balance to increase.

The distal-end portion 521b is a part including resin material, for example, and inserted into the second member 522. Specifically, the distal-end portion 521b includes a member capable of being bent in an X-axis direction that is a radial direction of the rotary shaft 2.

Specifically, in the example illustrated in FIG. 3, the distal-end portion 521b has a plurality of slits SL that are aligned at predetermined intervals in the circumferential direction of the rotary shaft 2. In other words, the slits SL are notches that are recessed toward a negative side of the Z-axis direction that is the rotation axis direction from the distal-end portion 521b toward the base-end portion 521a. A state in which the first member 521 is fixed to the rotary shaft 2 in a bent manner will be described later with reference to FIG. 5.

In the example illustrated in FIG. 3, a case is illustrated in which three slits SL are formed at regular intervals (120-degrees intervals). With this configuration, the distal-end portion 521b can be pressed evenly against the outer peripheral surface of the rotary shaft 2, and thus breakage of the distal-end portion 521b due to being pressed unevenly can be reduced. Herein, the number of the slits SL is not limited to three, and may be two or may be four or more. Widths, depths, shapes of the respective slits SL may be all the same, or may be different from each other.

In the example illustrated in FIG. 3, the distal-end portion 521b is configured to be capable of being bent by being provided with the slits SL. However, it is not limited to the slits SL that makes the distal-end portion 521b bendable.

For example, the distal-end portion 521b may be formed to have such a shape that the thickness thereof is smaller at a position more separated apart from the base-end portion 521a (also called "tapered shape"), and may thus have a shape that can be deformed by pressing force of the second member 522.

Referring to FIG. 4, the following describes the second member 522. As illustrated in FIG. 4, the second member 522 is a cylindrical member. The second member 522 includes, for example, hard material such as resin material or metallic material.

The bore diameter of a second end portion 522b of the second member 522 is smaller than that of a first end portion 522a thereof. The second end portion 522b is preferably in a state of not being in contact with the rotary shaft 2, and furthermore a gap between the second end portion 522b and the rotary shaft 2 is preferably as small as possible.

The second member 522 can be considered as a bent portion that is bent inward in the radial direction of the rotary shaft 2. The second member 522 is a part that is in contact with an inner ring of the bearing portion 53 if it is a ball bearing. In other words, bending the second member 522 allows the second member 522 to have a larger area that is in contact with the inner ring of the bearing portion 53, and thus the second member 522 can be applicable to bearing portions 53 having various widths of the inner ring. Furthermore, the second member 522 can increase in strength by being bent.

In FIG. 4, a case is illustrated in which the bore diameter of the second end portion 522b is smaller than that of the first end portion 522a. However, the bore diameters thereof may be the same.

As described above, the adjustment part for adjusting the rotational balance of the rotor 5 may be formed in the second member 522. In this case, for example, the second member 522 may be formed to have a large thickness, and this thick portion may be configured as the adjustment part.

Figure 5:
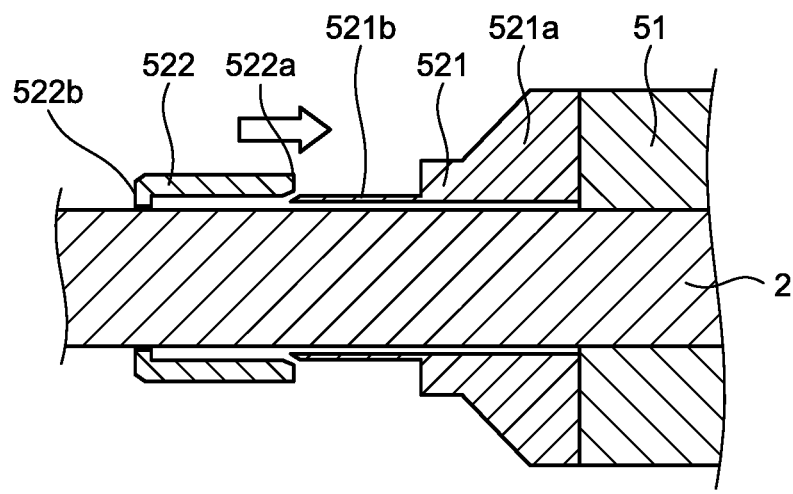
FIG. 5 includes diagrams illustrating a state change when the first member and the second member are mounted.
Figure 5:
Figure 5:
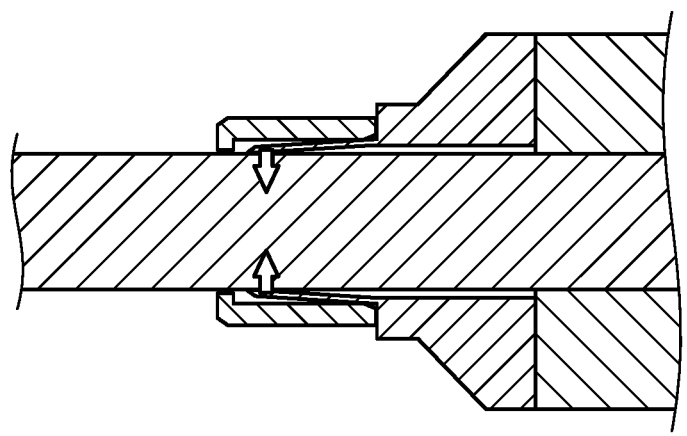
Figure 5:
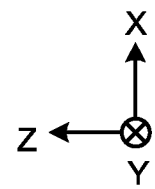

Referring to FIG. 5, the following describes a state change when the first member 521 and the second member 522 are mounted. FIG. 5 includes diagrams illustrating the state change when the first member 521 and the second member 522 are mounted. In FIG. 5, a case is illustrated in which the second member 522 is mounted in a state in which the first member 521 and the magnet 51 have been mounted on the rotary shaft 2. A diagram of a state before the mounting is illustrated in an upper part of FIG. 5, and a diagram of the state after the mounting is illustrated in a lower part thereof.

As illustrated in the upper part of FIG. 5, in the state before the second member 522 is mounted, the first member 521 is provided in a manner separated from the rotary shaft 2. The second member 522 is then mounted toward the first member 521 along the rotary shaft 2.

In the example illustrated in FIG. 5, the first end portion 522a of the second member 522 and the distal-end portion 521b of the first member 521 have tapered shapes. Specifically, the first end portion 522a of the second member 522 has a tapered shape that becomes narrower toward the first member 521, and the distal-end portion 521b has a tapered shape that becomes narrower toward the second member 522. With this configuration, insertion of the distal-end portion 521b into the second member 522 is facilitated, whereby the distal-end portion 521b can be prevented from breaking during manufacturing.

As illustrated in the lower part of FIG. 5, the second member 522 is fixed in such a manner that the first end portion 522a is in contact with an end surface of the base-end portion 521a of the first member 521 and also presses the distal-end portion 521b of the first member 521 against the rotary shaft 2. Being pressed by the second member 522, the distal-end portion 521b is brought into contact with the rotary shaft 2 in a manner bent toward the rotary shaft 2.

Specifically, as illustrated in the lower part of FIG. 5, the base-end portion 521a that is one end of the first member 521 closer to the magnet 51 is separated from the outer peripheral surface of the rotary shaft 2, and the distal end of the distal-end portion 521b that is the other end thereof is brought into contact with the rotary shaft 2 in a manner bent by press-fitting of the second member 522. With this configuration, the second member 522 is press-fitted onto the rotary shaft 2 with the first member 521 interposed therebetween, and consequently the balance adjusting portion 52 is fixed to the rotary shaft 2.

As described above, by using a member capable of being bent as the distal-end portion 521b of the first member 521, the balance adjusting portion 52 can be easily fixed to the rotary shaft 2 without using adhesive.

In FIG. 5, a case is illustrated in which the second member 522 is inserted onto the first member 521 to be fixed at a position where the first end portion 522a comes into contact with the base-end portion 521a of the first member 521. However, the second member 522 may be fixed in such a manner that the first end portion 522a and the base-end portion 521a are separated from each other.

In FIG. 5, the balance adjusting portion 52 is fixed in such a manner that the distal end of the distal-end portion 521b of the first member 521 and the second end portion 522b of the second member 522 are separated from each other. However, the balance adjusting portion 52 may be fixed in such a manner that the distal end of the distal-end portion 521b and the second end portion 522b are in contact with each other. In this case, the second end portion 522b can be considered to function as a stopper for the distal-end portion 521b.

Figure 6:
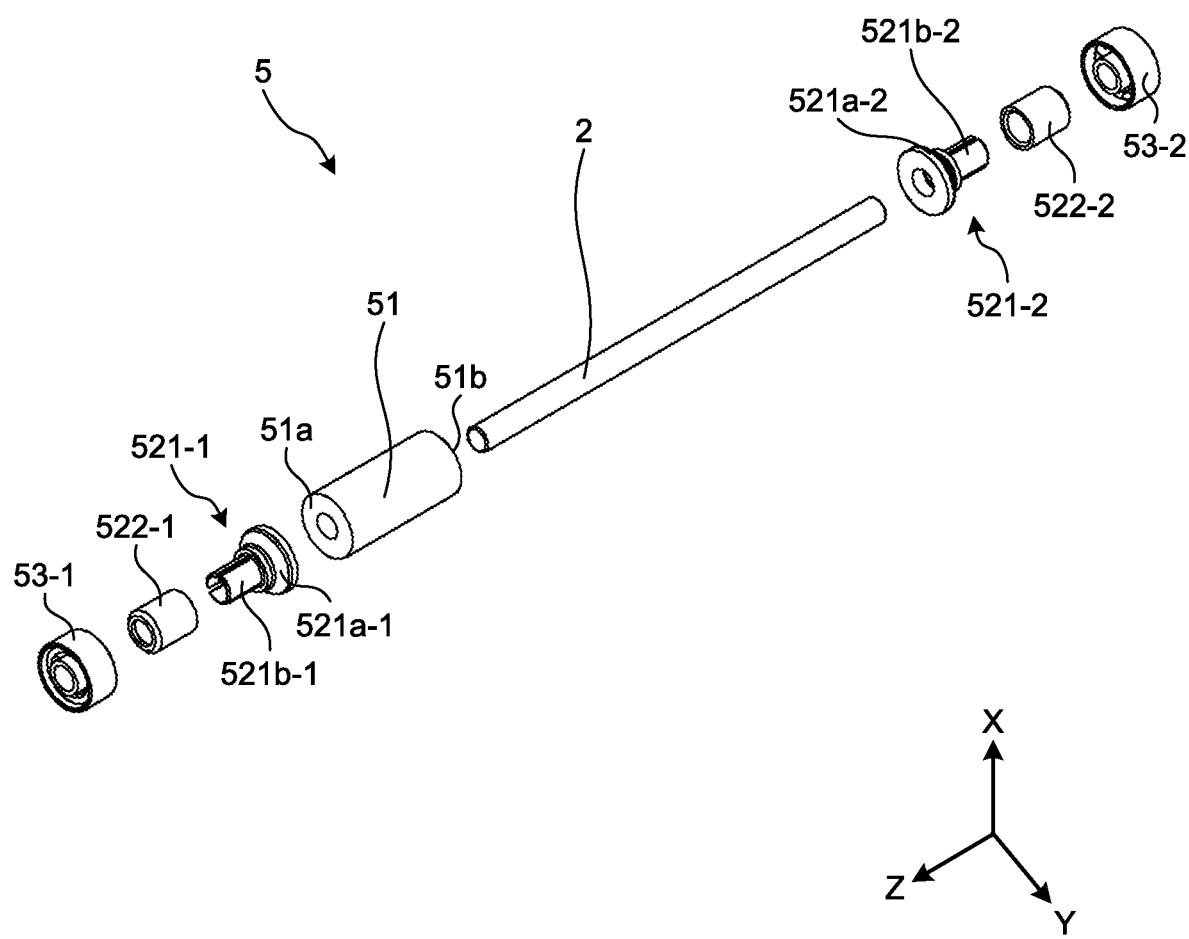
FIG. 6 is an exploded perspective view of a rotor according to the embodiment.
Figure 7:
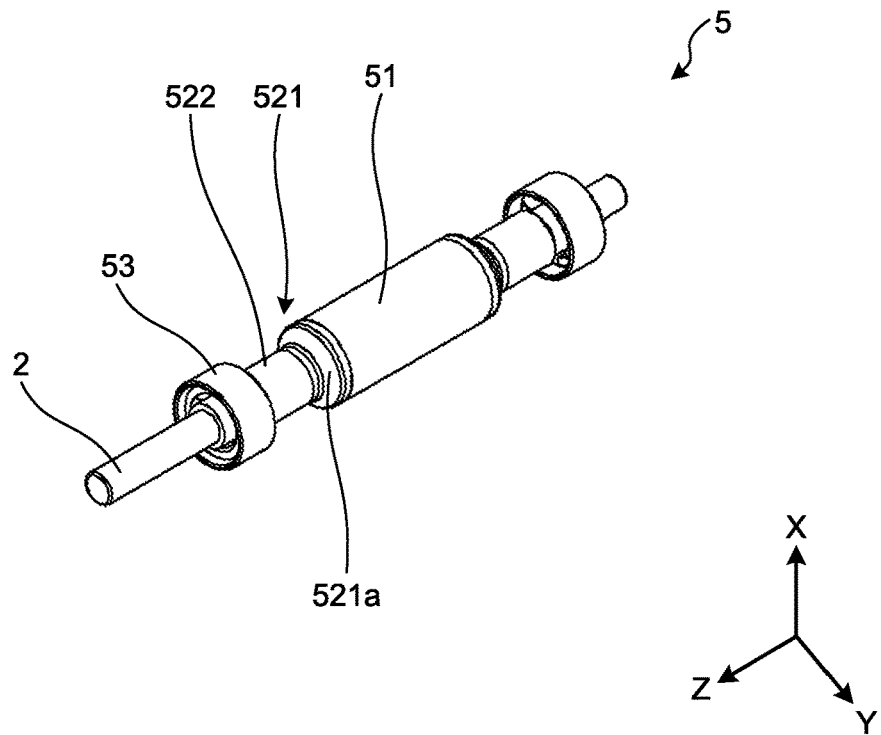
FIG. 7 is a perspective view of the rotor according to the embodiment.

Referring to FIG. 6 and FIG. 7, the following describes a method for manufacturing the rotor 5 according to the embodiment. FIG. 6 is an exploded perspective view of the rotor 5 according to the embodiment. FIG. 7 is a perspective view of the rotor 5 according to the embodiment.

In the method for manufacturing the rotor 5 according to the embodiment, one first member 521 of a pair of the first members 521 is inserted first onto the rotary shaft 2 to a predetermined position thereof. For example, to begin with, a first member 521-2 on the negative side in the Z-axis direction in FIG. 6 is inserted.

Subsequently, with the first member 521-2 being positioned so as not to be displaced in the rotation axis direction, a second member 522-2 is press-fitted onto the distal-end portion 521b-2 of the first member 521-2. Thus, the balance adjusting portion 52 including the first member 521-2 and the second member 522-2 is fixed to the rotary shaft 2.

Subsequently, in a state in which an adhesive member has been applied to two end surfaces 51a, 51b of the magnet 51, the magnet 51 is inserted onto the rotary shaft 2 from the positive side in the Z-axis direction to a position to come into contact with an end surface of the base-end portion 521a-2 of the first member 521-2. Thus, the end surface 51b of the magnet 51 and the end surface of the base-end portion 521a-2 are adhered and fixed together, and the magnet 51 is also fixed to the rotary shaft 2. Herein, the magnet 51 is adhered and fixed to the first member 521-2, and is thus less likely to be misaligned with the central axis of the rotary shaft 2. In other words, the magnet 51 is stopped from rotating by bonding to the first member 521-2, and thus rotational displacement that is displacement in the circumferential direction can be prevented. The adhesive member to be applied to the magnet 51 may be, for example, a double-sided tape, liquid adhesive, a welded resin member, or a welded metallic member.

Herein, before the magnet 51 is inserted, the adhesive member may be applied to the outer peripheral surface of the rotary shaft 2, whereby the adhesive member may be interposed between the rotary shaft 2 and the magnet 51 to fix them together. If the magnet 51 is a soft material such as a rubber magnet, the magnet 51 may be press-fitted to be fixed.

Subsequently, the other first member 521-1 is inserted onto the rotary shaft 2 from the positive side in the Z-axis direction to a position where an end surface of the base-end portion 521a-1 thereof comes into contact with the end surface 51a of the magnet 51. Thus, the end surface of the base-end portion 521a-1 of the first member 521-1 and the end surface 51a of the magnet 51 are adhered and fixed together.

Subsequently, a second member 522-1 is press-fitted onto the distal-end portion 521b-1 of the first member 521-1. Thus, the balance adjusting portion 52 including the first member 521-1 and the second member 522-1 is fixed to the rotary shaft 2. Subsequently, a pair of bearing portions 53-1, 53-2 is inserted onto the rotary shaft 2 from both ends so as to be press-fitted at positions to interpose the magnet 51, the first members 521-1, 521-2, and the second members 522-1, 522-2 therebetween, and thus manufacture of the rotor 5 illustrated in FIG. 7 is completed.

The rotational balance of the completed rotor 5 illustrated in FIG. 7 is measured. If imbalance is found, an outer peripheral surface of the base-end portion 521a that is an exposed portion in each first member 521 is shaved to correct the imbalance.

Herein, in the above-described method for manufacturing the rotor 5, the first member 521-2 and the second member 522-2 are inserted onto the rotary shaft 2 first, and then the magnet 51 is inserted. However, for example, after the magnet 51 is inserted, the first member 521-2 and the second member 522-2 may be inserted onto the rotary shaft 2.

While the adhesive member is applied to the end surfaces 51a, 51b of the magnet 51, the method is not limited to this. For example, at least one surface of the end surfaces 51a, 51b of the magnet 51 and the end surface of the first member 521 may be made coarse, so as to prevent the magnet 51 and the first member 521 from rotating in a manner independent of each other.

Specifically, surfaces of the balance adjusting portions 52 are made coarse so that the end surfaces of the first members 521 and the end surfaces 51a, 51b of the magnet 51 can be fixed to each other by frictional resistance generated by mutual surface roughness. With this configuration, the balance adjusting portions 52 can be attached to and detached from the magnet 51, whereby maintainability is enhanced.

As described above, the rotor 5 according to the embodiment includes the cylindrical magnet 51 and the balance adjusting portion 52. The balance adjusting portion 52 is provided to at least one end portion of the magnet 51 in the rotation axis direction, and are used for adjusting the rotational balance of the rotor 5. Each balance adjusting portion 52 has the first member 521 that is in contact with the corresponding end portion of the magnet 51 and the second member 522 press-fitted onto the rotary shaft 2 with the first member 521 interposed therebetween.

With this configuration, no gap is formed between the balance adjusting portion 52 and the rotary shaft 2, whereby the balance adjusting portion 52 can be prevented from being fixed to the rotary shaft 2 in an eccentric manner.

Furthermore, in the balance adjusting portion 52, the second member 522 is press-fitted onto the rotary shaft 2 with the first member 521 interposed therebetween. In other words, when the second member 522 is press-fitted, the surface of the rotary shaft 2 is protected by the first member 521. Thus, the surface of the rotary shaft 2 can be prevented from being damaged.

In the above-described embodiment, a case is illustrated in which each balance adjusting portion 52 and the magnet 51 are fixed to each other with the adhesive member, but the fixing method is not limited to this. For example, the balance adjusting portion 52 and the magnet 51 may be fixed to each other by a socket-and-spigot structure. This point will be described with reference to FIG. 8.

Figure 8:
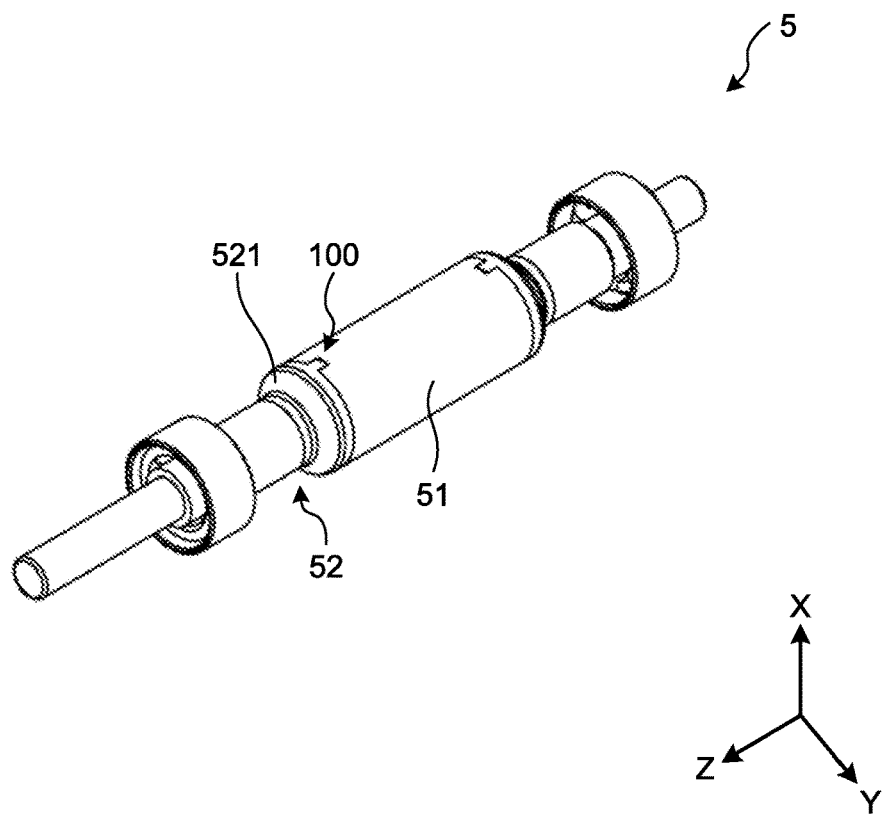
FIG. 8 is a perspective view of a rotor according to a modification.

FIG. 8 is a perspective view of a rotor 5 according to a modification. As illustrated in FIG. 8, a first member 521 of a balance adjusting portion 52 is fixed to end portions of the magnet 51 by a socket-and-spigot structure 100.

Specifically, each balance adjusting portion 52 has a protruding portion protruding from the corresponding first member 521 toward the magnet 51. The magnet 51 has recessed portions on the end portions each of which is recessed away from the corresponding first member 521. The protruding portion of each first member 521 and the corresponding recessed portion of the magnet 51 engage with each other to form the socket-and-spigot structure 100. With this configuration, the balance adjusting portion 52 and the magnet 51 are fixed to each other, and are thus prevented from rotating in a manner independent of each other.

As described above, by using the socket-and-spigot structure 100, the balance adjusting portion 52 can be fixed to the magnet 51 in a detachable manner without adding an additional member.

The present invention is not limited to the above-described embodiment. The present invention also includes appropriate combinations of components described above. Further effects and modifications could be easily thought of by the skilled person in the art. Thus, a wider aspect of the present invention is not limited to the above-described embodiment but may include various changes.

REFERENCE SIGNS LIST 1 motor
2 rotary shaft
3 body portion
4 stator
5 rotor
31 tubular portion
32 first cap
33 second cap
41 stator core
42 coil
51 magnet
51a, 51b end surface
52 balance adjusting portion
53, 53-1, 53-2 bearing portion
100 socket-and-spigot structure
521, 521-1 first member
521a, 521a-1, 521a-2 base-end portion
521b, 521b-1, 521b-2 distal-end portion
522, 522-1, 522-2 second member
522a first end portion
522b second end portion
SL slit

The invention claimed is:

1. A rotor comprising:
a cylindrical magnet into which a rotary shaft is inserted; and
a balance adjusting portion provided to at least one end portion of the magnet in a rotation axis direction and used for adjusting rotational balance of the rotor, wherein
the balance adjusting portion has
a first member that is in contact with the end portion of the magnet, and
a second member press-fitted onto the rotary shaft with the first member interposed therebetween.

2. The rotor according to claim 1, wherein one end of the first member that is closer to the magnet is separated from an outer peripheral surface of the rotary shaft, and the other end of the first member is in contact with the rotary shaft in a manner bent by press-fitting of the second member.

3. The rotor according to claim 2, wherein a slit extending in the rotation axis direction is formed in the first member on the other end side.

4. The rotor according to claim 1, wherein an adjustment part allowing the rotational balance to be adjusted is formed in the first member.

5. The rotor according to claim 1, further comprising a pair of bearing portions provided in a press-fitted manner at positions between which the magnet and the balance adjusting portion are interposed in the rotation axis direction and configured to rotatably support the rotary shaft.

6. The rotor according to claim 1, wherein the first member of the balance adjusting portion is fixed to the end portion of the magnet.

7. The rotor according to claim 6, wherein the first member of the balance adjusting portion is fixed to the end portion of the magnet with an adhesive member.

8. The rotor according to claim 6, wherein the first member of the balance adjusting portion is fixed to the end portion of the magnet by a socket-and-spigot structure.

9. The rotor according to claim 6, wherein the first member of the balance adjusting portion and the end portion of the magnet are fixed to each other by frictional resistance generated by mutual surface roughness.

10. A motor comprising:
the rotor according to claim 1; and
a stator.

11. A method for manufacturing a rotor, the method comprising:
a magnet insertion step of inserting a cylindrical magnet onto a rotary shaft; and
a balance-adjusting-portion insertion step of inserting a balance adjusting portion adjusting rotational balance of a rotor onto the rotary shaft at at least one end portion of the magnet in a rotation axis direction, wherein
the balance-adjusting-portion insertion step includes
a first step of inserting a first member onto the rotary shaft to a position where the first member comes into contact with the end portion of the magnet; and
a second step of inserting a second member onto the rotary shaft to press-fit the second member onto the rotary shaft with the first member interposed therebetween.

12. A method for manufacturing a rotor, the rotor including
a cylindrical magnet into which a rotary shaft is inserted, and
a balance adjusting portion provided to at least one end portion of the magnet in a rotation axis direction and used for adjusting rotational balance of the rotor, wherein
the balance adjusting portion has a first member that is in contact with the end portion of the magnet and a second member press-fitted onto the rotary shaft with the first member interposed therebetween,
the method comprising:
a first step of inserting the first member onto the rotary shaft;
a second step of, after the first step, inserting the second member onto the rotary shaft to press-fit the second member onto the rotary shaft with the first member interposed therebetween; and
a magnet insertion step of, after the second step, inserting the magnet onto the rotary shaft to a position where an end portion of the magnet comes into contact with the first member.

* * * * *